(12) United States Patent
Spanos (10) Patent No.: US 11,172,113 B2
(45) Date of Patent: Nov. 9, 2021

(54) CAMERA SYSTEM INCLUDING A PROXIMITY SENSOR AND RELATED METHODS

(71) Applicant: PURELIFI LIMITED, Edinburgh (GB)

(72) Inventor: Angelos Spanos, Edinburgh (GB)

(73) Assignee: PURELIFI LIMITED, Edinburgh (GB)

(*) Notice: Subject to any disclaimer, the term of this patent is extended or adjusted under 35 U.S.C. 154(b) by 67 days.

(21) Appl. No.: 16/087,202

(22) PCT Filed: Mar. 21, 2017

(86) PCT No.: PCT/GB2017/050792
§ 371 (c)(1),
(2) Date: Sep. 21, 2018

(87) PCT Pub. No.: WO2017/163054
PCT Pub. Date: Sep. 28, 2017

(65) Prior Publication Data
US 2019/0132503 A1  May 2, 2019

(30) Foreign Application Priority Data
Mar. 25, 2016  (GB) ...................... 1605142

(51) Int. Cl.
| H04N 5/232 | (2006.01) |
| H04N 5/225 | (2006.01) |
| H04N 5/33 | (2006.01) |
| H04N 5/335 | (2011.01) |
| H04B 10/116 | (2013.01) |
| H04N 9/04 | (2006.01) |
| H04N 5/369 | (2011.01) |
(Continued)

(52) U.S. Cl.
CPC ....... *H04N 5/23203* (2013.01); *H04B 10/116* (2013.01); *H04B 10/516* (2013.01);
(Continued)

(58) Field of Classification Search
CPC .... H04N 5/23203; H04N 5/332; H04N 5/335; H04N 9/045; H04N 5/3696;
(Continued)

(56) References Cited

U.S. PATENT DOCUMENTS 8,138,466 B2    3/2012  Hosaka
10,236,979 B2 *  3/2019  Kuraki ................ H04B 10/116
(Continued)

FOREIGN PATENT DOCUMENTS

| EP | 3190726 A1 | 7/2017 |
| JP | 2008098976 A | 4/2008 |
| WO | 2016034037 A1 | 3/2016 |

OTHER PUBLICATIONS

Goto et al., "BER Characteristic of Optical-OFDM using OCI", 2014 IEEE Asia Pacific Conference on Circuits and Systems (APCCAS), Ishigaki, JP, Nov. 17-20, 2014, pp. 328-331.
(Continued)

*Primary Examiner* — Hung H Lam
(74) *Attorney, Agent, or Firm* — Myers Bigel, P.A.

(57) ABSTRACT

A camera for capturing an image comprising: an image sensor configured to generate image sensor data in response to received light; a processing resource configured to process the image sensor data to obtain image data and communication data, wherein obtaining the communication data comprises performing a demodulation process in respect of at least part of the image sensor data, wherein the processing resource is further configured to transmit the communication data and the image data to at least one further processing resource.

27 Claims, 8 Drawing Sheets

(51) Int. Cl.
*H04N 5/235* (2006.01)
*H04B 10/516* (2013.01)

(52) U.S. Cl.
CPC ......... *H04N 5/2256* (2013.01); *H04N 5/2354* (2013.01); *H04N 5/23229* (2013.01); *H04N 5/332* (2013.01); *H04N 5/335* (2013.01); *H04N 5/3696* (2013.01); *H04N 9/045* (2013.01); *H04N 9/0451* (2018.08)

(58) Field of Classification Search
CPC .. H04N 5/2354; H04N 9/0451; H04N 5/2256; H04N 5/23229; H04B 10/116; H04B 10/516
See application file for complete search history.

(56) References Cited

U.S. PATENT DOCUMENTS

| | | | | |
|---|---|---|---|---|
| 2004/0101309 A1* | 5/2004 | Beyette, Jr. | ........ | H04B 10/1121 398/115 |
| 2008/0297487 A1 | 12/2008 | Hotelling et al. | | |
| 2011/0052214 A1 | 3/2011 | Shimada et al. | | |
| 2011/0188845 A1 | 8/2011 | Hanayama et al. | | |
| 2014/0241732 A1* | 8/2014 | Ishida | ................. | H04B 10/66 398/130 |
| 2014/0346361 A1 | 11/2014 | Wang et al. | | |
| 2017/0244482 A1* | 8/2017 | Dimare | ................. | H04K 1/00 |
| 2018/0212679 A1* | 7/2018 | Shim | ................. | H04B 10/116 |

OTHER PUBLICATIONS

Danakis et al., "Using a CMOS Camera Sensor for Visible Light Communication", 2012 IEEE Globecom Workshops, Anaheim, CA, Dec. 3-7, 2012, pp. 1244-1248.

International Search Report and Written Opinion of the International Searching Authority corresponding to International Application No. PCT/GB2017/050792 dated Jun. 19, 2017 (18 pages).

"Communication pursuant to Article 94(3) EPC", EP Application No. 17717817.5, Mar. 2, 2021, 6 pp.

"Notice of Reason for Refusal and English language translation", KR Application No. 10-2018-7030728, dated Nov. 30, 2020, 36 pp.

* cited by examiner

Fig. 11

CAMERA SYSTEM INCLUDING A PROXIMITY SENSOR AND RELATED METHODS

CROSS REFERENCE TO RELATED APPLICATIONS

This application is a 35 U.S.C. § 371 national stage application of PCT International Application No. PCT/GB2017/050792, filed on Mar. 21, 2017, which claims priority from Great Britain Patent Application No. 1605142.7, filed on Mar. 25, 2016, the contents of which are incorporated herein by reference in their entireties. The above-referenced PCT International Application was published in the English language as International Publication No. WO 2017/163054 A1 on Sep. 28, 2017.

FIELD OF THE INVENTION

The present invention relates to a camera system, for example a camera system that includes at least one of an image sensor, a proximity sensor, an ambient light sensor, and a flash unit.

BACKGROUND OF THE INVENTION

Camera modules have been widely adopted in smart devices, such as smart phones and tablets. In addition to front and/or back facing cameras, such devices usually have a sensor for sensing proximity signals, sensors for sensing ambient light and flash units.

Wireless optical communication offers advantages over conventional radio frequency wireless communication, and has been implemented using a variety of devices.

SUMMARY OF THE INVENTION

In a first aspect of the invention, there is provided a camera for capturing an image comprising: an image sensor configured to generate image sensor data in response to received light; a processing resource configured to process the image sensor data to obtain image data and communication data, wherein obtaining the communication data comprises performing a demodulation process in respect of at least part of the image sensor data, wherein the processing resource is further configured to transmit the communication data and the image data to at least one further processing resource.

The image data may comprise pixel data. The communication data may comprise optical wireless communication data.

The image sensor and processing resource may form part of or be on a single chip.

The at least one further processing resource may be outside the chip and/or may comprise or form part of a further chip. The at least one further processing resource may be within the camera, for example within an outer housing of the camera.

The processing resource may comprise a first processor and a second processor. The first processor may be configured to process the image sensor data and the second processor may be configured to process the communication data. Thus, separate processors may be provided. The processing of the image sensor data and the communication data may comprise processing the image sensor data and the communication data such that it is in a form to be transmitted via an interface to the further processing resource. The interface may comprise a camera serial interface.

The camera may comprise a control bus or interface for carrying control data between the processing resource and the further processing resource, and a further bus or interface for carrying the communication data and/or image data between the processing resource and the further processing resource. The further bus or interface may comprise a CSI bus or interface, for example a CSI-2 or CSI-3 bus or interface. The control bus or interface may comprise an I2C bus or interface. The control bus or interface may be configured to operate at a slower data transmission rate and/or have a lower bandwidth than the further bus or interface. The communication data may be received and/or transmitted and/or demodulate at a rate of at least 10 Mbps, optionally at least 20 Mbps, optionally at least 40 Mbps.

The further processing resource may comprise a camera processor for controlling operation of the camera. The camera processor may control at least one aspect of operation of the camera, for example capturing images, controlling operation of at least one of image exposure time, image resolution, aperture, controlling storage and/or retrieval of data for example images in a memory, controlling interaction with a user and/or display or operation of a user interface.

The image sensor may comprise an array of sensor elements comprising image sensor elements for generating image signals in response to received light. Each image sensor element may be configured to sense light of a respective one of a plurality of different colours. The array may comprise communication sensor elements for generating communication signals in response to received light. The communication sensor elements may be distributed in the image sensor array in groups of one or more communication sensor elements. One or more, optionally each, optionally substantially all, of said groups may be surrounded by image sensor elements.

The image sensor elements configured to sense light of a respective one of a plurality of different colours may be sensitive to light of different wavelength ranges. The different types of image sensor elements may have different profiles of sensitivity as function of wavelength. The light may comprise light of any suitable part of the electromagnetic spectrum, for example visible light or infrared light.

The array may comprise a repeating arrangement of unit cells, each unit cell may comprise at least one communication sensor element and a plurality of image sensor elements.

The unit cell may comprise three image sensor elements.

The image sensor elements of the unit cell may comprise a sensor element for sensing red light, a sensor element for sensing green light and a sensor element for sensing blue light.

Each communication sensor element may be configured to sense light of the same wavelength or wavelength range. For example, each communication sensor element may have substantially the same profile of sensitivity as function of wavelength. Alternatively, each communication sensor element may be configured to sense light of a respective one of a plurality of different wavelengths or wavelength ranges. For example, each communication sensor element may have a respective one of a plurality of different profiles of sensitivity as function of wavelength.

The image sensor may comprise an image sensor array of sensor elements comprising: image sensor elements for generating image signals in response to received light, wherein each image sensor element may be configured to sense light of a respective different colour; communication sensor elements for generating communication signals in response to received light, wherein the communication sensor elements may be arranged in one or more rows or columns extended along one or more edges of the image sensor array.

The camera may further comprise: image signal conditioning circuitry configured to collect the generated image signals from the image sensor elements and condition the generated image signals into a form suitable for the processing resource; and communication signal conditioning circuitry to collect the generated communication image signals from the communication sensor elements and condition the generated communication signals into a form suitable for the processing resource.

The communication signal conditioning circuitry may comprise one or more analogue to digital convertors (ADCs) configured to sample the communication signals at a frequency characteristic of an optical light communication signal.

The image signal conditioning circuitry may comprise at least one analogue to digital convertor (ADC).

The ADC(s) of the communication signal conditioning circuitry may be configured to operate, for example to sample signals, at a faster rate than the ADC(s) of the image signal conditioning circuitry. The ADC(s) of the communication signal conditioning circuitry may be configured to sample the communication signal at a rate of at least 100 MHz, optionally at least 160 MHZ. The ADC(s) of the communication signal conditioning circuitry may be larger, for example have a larger cross-sectional area, than the ADC(s) of the image signal conditioning circuitry. A separate ADC of the image signal conditioning circuitry may be provided for each image sensor element or for each subgroup of image sensor elements, for example each unit cell. A separate ADC of the communication sensor element may be provided for each communication sensor element.

The processing resource may be configured to transmit the communication and image data over an interface in parallel or in series.

The interface may comprise a camera serial interface (CSI). The interface may comprise a CSI-2 or CSI-3 interface.

The camera may comprise a flash unit. The processing resource may be further configured to provide a modulation signal encoding communication data to the flash unit such that the flash unit produces an optical communication signal.

The flash unit may further comprise one or more flash emitters and/or one or more communication emitters. The processing resource may be further configured to provide the modulation signal encoding communication data to the flash emitters and/or a flash signal to the flash emitters.

In a further aspect of the invention, which may be provided independently, there is provided a proximity sensor configured to generate proximity data representative of a nearby object using optical signals comprising:
  an emitter configured to produce an outgoing optical signal;
  a receiver configured to receive an incoming optical signal; and
  a processing resource configured to perform at least one of a) and b)
    a) a demodulation process in respect of at least part of the incoming optical signal to obtain incoming communication data;
    b) a modulation process to encode outgoing communication data on at least part of the outgoing optical signal.

The processing resource may be further configured to transmit the incoming communication data to at least one further processing resource and/or to receive the outgoing communication data from at least one further processing resource The emitter, receiver and processing resource may be integrated on a single chip.

The at least one further processing resource may be outside the chip and/or may comprise or form part of a further chip.

The proximity sensor may further comprise driving circuitry to provide a modulation signal to the emitter. The modulation signal may be based on the outgoing communication data received from one further processor.

The driving circuitry may comprises a digital to analogue convertor configured to provide a modulation signal at a frequency characteristic of an optical light communication signal.

The receiver may comprise a sensor generating a communication signal in response to received light, and conditioning circuitry to collect the communication signal and condition the communication signal into a form suitable for the processing resource.

The processing resource may be configured to transmit and/or receive communication data and proximity data in series over a first interface.

The processing resource may be configured to transmit and/or receive communication data and proximity data in parallel over a first and second interface.

The first interface may comprise a high speed interface.

The second interface may comprise a slower interface than the first interface, for example the second interface may be configured to transmit data at a lower rate than the first interface. The second interface may be configured to transmit some or all of the proximity data. The first interface may be configured to transmit some or all of the communication data.

The first interface may comprise a camera serial interface (CSI). The first interface may comprise, for example, a CSI-2 or CSI-3 interface.

The emitter and receiver may be positioned on an edge of a housing of the proximity sensor.

In a further aspect of the invention, which may be provided independently, there is provided a camera system comprising:
  a camera comprising:
    an image sensor configured to generate image sensor data in response to received light;
    a camera processing resource configured to process the image sensor data to obtain image data and incoming communication data.

Obtaining the incoming communication data may comprise performing a demodulation process in respect of at least part of the image sensor data. The processing resource may be further configured to transmit the incoming communication data and the image data to at least one further processing resource. The system may further comprise a proximity sensor configured to generate proximity data representative of a nearby object using optical signals. The proximity sensor may comprise an emitter configured to produce an outgoing optical signal. The proximity sensor may comprise a proximity processing resource configured to perform a modulation process to encode outgoing communication data on at least part of the outgoing optical signal and/or to receive the outgoing communication data from at least one further processing resource.

The camera system may comprise an integrated camera and proximity sensor module. Each of the components of the camera system may be within a single housing.

The camera processing resource may be configured to transmit the incoming communication data and image data in series or in parallel over a first interface. The proximity processing resource may be configured to receive outgoing communication data over a second interface.

The camera system may further comprise a control bus for carrying control data between the camera processing resource, the proximity processing resource and at least one further processing resource.

In a further aspect of the invention, which may be provided independently, there is provided an image sensor array comprising:
   image sensor elements for generating image signals in response to received light, wherein each image sensor element is configured to sense light of a respective different colour;
   communication sensor elements for generating electrical communication signals in response to received light, wherein
   the communication sensor elements are either:
      distributed in the image sensor array in groups of one or more communication sensor elements, wherein one or more said groups are surrounded by image sensor elements or
      the communication sensor elements are arranged in one or more rows or columns extended along one or more edges of the image sensor array.

In a further aspect of the invention, which may be provided independently, there is provided a flash unit for use with a camera, comprising an emitter configured to produce an outgoing optical signal, wherein the flash unit is configured to receive a modulation signal encoding communication data and in response to produce the outgoing optical signal such that it comprises or represents the communication data.

The outgoing optical signal may comprise a modulated optical communication signal. The emitter may be further configured to receive a flash signal and to output a flash in response to the flash signal.

In a further aspect of the invention, which may be provided independently, there is provided a flash system comprising a flash unit as claimed or described herein and a processing resource configured to generate the modulation signal and provide the modulation signal to the emitter.

The flash unit may further comprise one or more flash emitters and one or more communication emitters, wherein the processing resource is further configured to provide the modulation encoding communication data to the flash emitters and a flash signal to the flash emitters.

In further aspects of the invention there is provided a camera as claimed or described herein or a camera system as claimed or described herein, further comprising a proximity sensor as claimed or described herein and/or an image sensor array as claimed or described herein and/or a flash unit as claimed or described herein and/or a flash system as claimed or described herein.

In a further aspect of the invention, which may be provided independently, there is provided a method of receiving communication data comprising generating image sensor data in response to received light, processing the image sensor data to obtain image data and communication data, wherein obtaining the communication data comprises performing a demodulation process in respect of at least part of the image sensor data.

In a further aspect of the invention, which may be provided independently, there is provided a method of transmitting or receiving communication data comprising:
   using an emitter of a proximity sensor to emit light that comprises or represents communication data; and/or
   using a receiver of a proximity sensor to receive light that comprises or represents communication data, generating a signal by the receiver in response to the received light, and processing the received signal to extract the communication data.

In a further aspect of the invention, which may be provided independently, there is provided a method of transmitting communication data comprising using a camera flash unit to emit light that comprises or represents communication data.

Features in one aspect may be applied as features in another aspect in any appropriate combination. For example, any one of apparatus, camera, array, sensor, system or method features may be applied as any one other of apparatus, camera, array, sensor, system or method features.

BRIEF DESCRIPTION OF THE DRAWINGS

Various aspects of the invention will now be described by way of example only, and with reference to the accompanying drawings, of which.

DETAILED DESCRIPTION OF THE DRAWINGS

Figure 1:
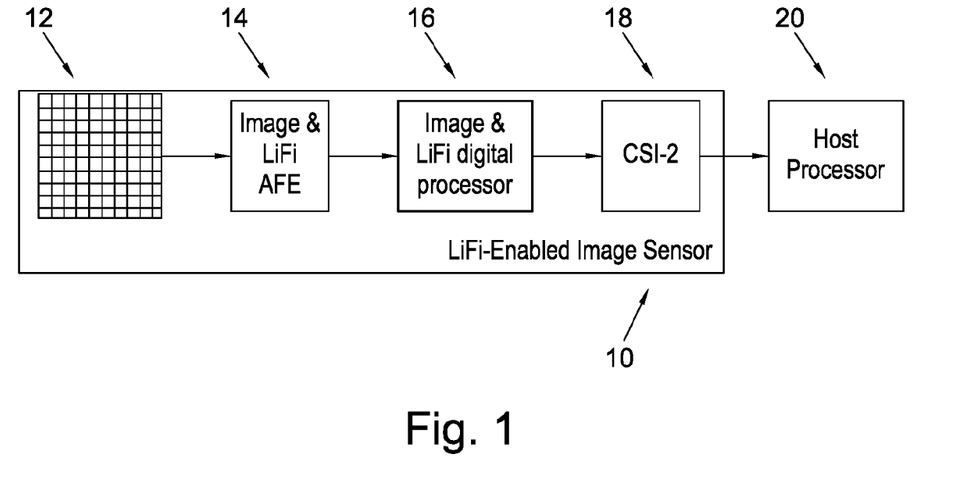
FIG. 1 is a block diagram of an image sensor with wireless optical communication capability according to an embodiment.

FIG. 1 shows a block diagram of an image sensor 10. The image sensor 10 has the following components: an image sensor array 12, an analogue front end 14, a processing resource 16 and a data interface 18. The image sensor 10 is communicatively coupled to a host processor 20. The host processor can belong to a variety of different devices, for example, a tablet, a smart phone or a digital camera. The image sensor array 12 provides an input to the analogue front end 14, which in turn is connected to the processing resource 16. The data interface 18 is provided between the processing resource 16 and the host processor 20 for supplying image and communication data from the image sensor 10 to the host processor 20. The image sensor array 12, the analogue front end 14 and the processing resource 16 are integrated on a single chip.

The image sensor 10 is configured to receive and process light containing image information and communication information. The image sensor 10 is configured to operate in two parallel channels: an image channel and a communication channel. The image channel is concerned with sensing image signals and outputting image data. The communication channel is concerned with sensing communication signals and outputting communication data. The input to both channels is the image sensor array 12. The image sensor array 12 is a grid of sensor elements or pixels for receiving and sensing incident light. The sensor elements may be either image sensors elements for capturing image information or communication sensor elements for sensing communication signals. The sensor elements comprise photodiodes or other optical sensing elements. The image sensor elements receive the input light to the image channel and the communication sensor elements receive the input light to the communication channel. Different suitable arrangement patterns of sensor elements are described with reference to FIG. 2 and FIG. 3. The image sensor is constructed by repeating these patterns.

Light reflected or transmitted from an object is suitable for capturing an image of the object, as the intensity of the light received contains image information about the object and this information may be used to construct an image of the object. Colour information is obtained by having individual image sensor elements in the image sensor array 12 that respond to specific frequencies of light. Each individual image sensor element converts light into an electrical signal the magnitude of which is proportional to the intensity of the light sensed by the sensor element. Therefore, at each image sensor element location, the intensity of light of a specific frequency is measured. By collecting intensities from all image sensor elements, raw image information including information about the intensity of different colours over the image sensor array 12 is gathered. The image sensor array 12 can contain active pixels, for example it could be a complementary metal-oxide-semiconductor (CMOS) sensor, where each sensor element contains a photodetector, for example a photodiode, and an active amplifier. Another example of a suitable image sensor array 12 is a hybrid charge-coupled-device (CCD) and CMOS sensor. A hybrid image sensor array has CCD image sensor elements for image capture and CMOS sensor elements for communication signal capture.

Together with collecting image information, the intended use of the image sensor 10 is to receive and process light that also includes one or more components corresponding to a wireless optical communication signal sent from a wireless optical communication transmitter. The image sensor array 12 has dedicated communication sensor elements for capturing communication information. The communication sensor elements receive light for input into the communication channel.

The analogue front end 14 is coupled to the image sensor array 12 and has two parts, each corresponding to one of the two channels. For the image channel, the analogue front end 14 has dedicated circuitry for collecting and conditioning the sensed image signals and for the communication channel, the analogue front end 14 has dedicated circuitry for collecting and conditioning the sensed communication signals. The analogue front end 14 contains analogue to digital convertors for converting the sensed electronic signals into digital signals for the processing resource 16. Due to the nature of the incoming optical and hence electronic signals, the properties of the analogue to digital convertors may differ between the two parts.

An analogue to digital convertor converts an input analogue signal into an output digital signal. Two properties of analogue to digital convertors relevant to the design and manufacture of the different parts of the analogue front end 14 are: resolution and size. The resolution of the convertor is the number of discrete levels the convertor can produce over the range of the input analogue signal. For image electronic signals, the analogue to digital convertors are chosen such that the digital resolution of the image meets a pre-determined image quality. On the other hand, the analogue to digital convertors for communication should be suitable to respond and sample a higher frequency of electronic signals stemming from received wireless optical communication signals. Values of the frequency of electronic signals may be 100 MHz and above. For example, to deliver bandwidth of 40 MBps, a digital to analogue convertor is usually configured to sample at at least 160 MHz.

The size of an analogue to digital convertor is a further physical consideration when manufacturing circuits. Of particular importance here is the physical area spanned by each analogue to digital convertor. For capturing an image, each image sensor element of the image sensor array 12 has a corresponding analogue to digital convertor. Alternatively, the image sensor elements of the image sensor array 12 are grouped into subgroups each having a dedicated analogue to digital convertor. In either case, thousands of analogue to digital convertors need to be implemented to capture an image and thus the physical limits in size of the chip and size of the circuit board limit the choice of suitable analogue to digital convertors to ones that have a small area. On the other hand, the communication analogue to digital convertors are fewer in number and can therefore have a larger area.

The processing resource 16 has processes digital signals relating to a captured image and processes digital signals relating to a wireless optical communication signal. The processing resource 16 may be two separate processors: a first processor dedicated to processing image signals and a second processor dedicated to processing communication signals.

In use, light containing both information about the image being captured and an incoming wireless optical communication signal is incident on the image sensor array 12. As described above, the image sensor 10 operates in two channels: the image channel and the communication channel. These channels operate simultaneously and in parallel. Firstly, the image channel has input sensed by the image sensor elements of the image sensor array 12 that convert light into electronic signals such that the electronic signals contain raw image information. The conversion is carried out by a photodiode. The electronic signals are then provided to the analogue front end 14. The circuitry of the analogue front end 14 collects the electronic image signals and conditions these signals into a suitable form for the image processor of the processing resource 16. Conditioning includes one or more filtering steps applied to the electronic signal. These steps may be a low pass filter and a high pass filter. A value for a low pass filter according to an embodiment is 25 MHz, e.g. the frequency value below which signals are passed may be 25 MHz. A value for a high pass filter according to an embodiment is 300 KHz, e.g. the frequency value below which signals are passed may be 300 KHz. Conditioning includes converting the analogue electronic image signals into digital image signals using at least one dedicated analogue to digital convertor. The image processor of the processing resource 16 is then configured to process the digital image signals to produce image data suitable for constructing a digital representation of the captured image. The image data output of the processing resource 16 is then provided to the data interface 18 to be sent to a further processor.

Turning to the communication channel, the image sensor 10 captures incoming communication signals and communication data is produced. The communication sensor elements of the image sensor array 12 convert incident light into electronic signals such that the electronic signals contain raw communication information. The electronic signals are provided to the dedicated communication circuitry of the analogue front end 14 which collects and conditions the electronic communication signals into a suitable form for the processing resource 16. Conditioning can include the optional steps of amplifying the weak electrical signal induced in the sensor element and equalisation of received signals. Conditioning includes converting the analogue electronic communication signals into digital communication signals using at least one dedicated analogue to digital convertor. The digital signal is then passed to the communication part of the processing resource 16 which demodulates the digital signal to extract communication data that are encoded in the wireless optical communication signal. Any suitable modulation schemes may be used, for example non on-off keying modulation schemes are used in some embodiments, and the demodulation is a demodulation from the non on-off keying modulation scheme. Other non-complex modulation schemes, for example modulation schemes that do not include or that are not based on real and imaginary parts, may be implemented in some other embodiments.

The communication data output from the processing resource 16 is then provided to the data interface 18. The data interface 18 sends communication data output from the communication channel, together with the image data from the image channel, to the host processor 20. The interface and operation of the interface is described in more detail with reference to FIG. 4 and FIG. 5.

Figure 2:
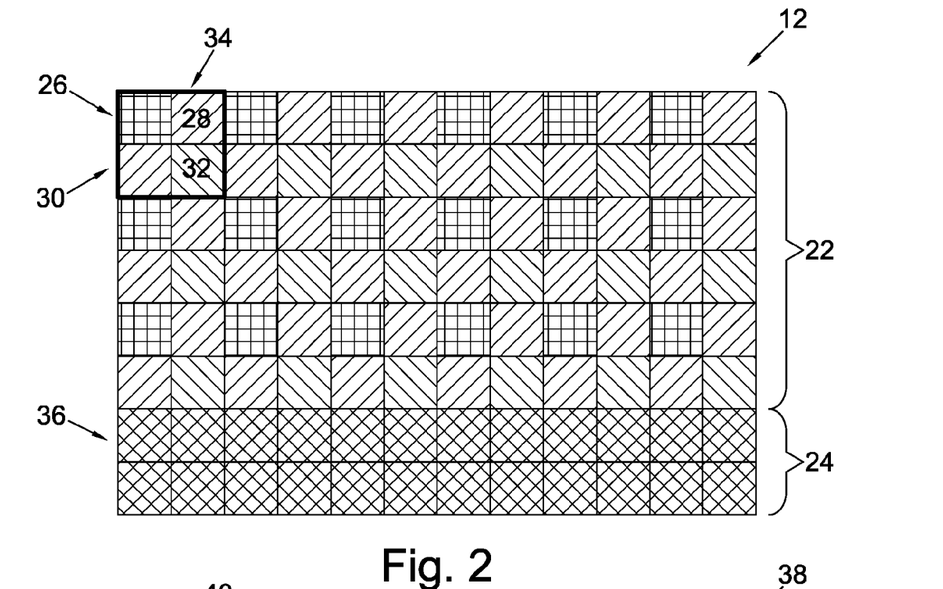
FIG. 2 is a representative diagram of an arrangement of sensor elements according to an embodiment.

FIG. 2 shows an example of an arrangement pattern of sensor elements suitable for the image sensor array 12 of the image sensor 10. The image sensor array 12 has a grid of sensor elements or pixels for receiving and sensing incident light. Two types of sensor element are shown: an image sensor element and a communication sensor element. Each image sensor element belongs to the following group: a blue sensor element for sensing blue light, a red sensor element for sensing red light and a green sensor element for sensing green light. Communication sensor elements that respond to different wavelengths can also be employed using filters. By introducing a variance in the wavelengths that different communication pixels respond to, higher throughputs for communication may be achieved.

The image sensor array 12 is represented by a rectangular grid with a length of 12 sensor elements and a height of 8 sensor elements. The image sensor array 12 is made up of two sensor element arrays: a colour sensor array 22 and a communication sensor array 24. The colour sensor array 22 has four component image sensor elements: a blue sensor element 26, a first green sensor element 28, a second green sensor element 30 and a red sensor element 32. Together these four component image sensor elements, arranged is a square of two sensor elements by two sensor elements define a unit cell 34, where the unit cell 34 is the smallest, repeating pattern of the colour sensor array 22. Starting from the left hand side, the first row of the unit cell 34 is the blue sensor element 26 followed by the first green sensor element 28. Again, starting from the left hand side, the second row of unit cell 34, below the first row, has the second green sensor element 30 followed by the red sensor element 32. The unit cell 34 has the first green sensor element 28 and the second green sensor element 30 in opposite diagonal positions from each other. The human eye is more sensitive to green colour than red or blue. By providing two green sensor elements for every one red and one blue sensor element, the colour sensor array 22 provides an enhanced perceptual signal to noise ratio for a human eye. The colour sensor array 22 can be drawn by repeating the unit cell 34. The unit cell 34 shown in FIG. 2 has the same colour pattern as a Bayer filter.

The pattern of the communication sensor array 24 shown in image sensor array 12 of FIG. 2 has two rows of 12 sensor elements. Each sensor element of the communication sensor array 24 is a communication sensor element 36. The rows of communication sensor elements are arranged at the periphery, in this case, along the bottom edge of the image sensor array 12. Although FIG. 2 shows only one such set of rows arranged along one edge, the communication pixel arrays can be arranged to extend along two edges (either opposite or adjacent), three edges or along all four edges of the image sensor array 12.

Positioning the communication sensor array 24 at the periphery of the image sensor array 12 allows for communication signals to be received while keeping the same perceptual signal to noise ratio for imaging due to maintaining the number of green sensor elements in the colour sensor array 22. However, compared to an image sensor array 12 with no communication sensor elements, the overall number of image sensor elements is reduced leading to a reduction in number of sensor elements available for an image. Advantageously, no optical artefacts are introduced by this arrangement.

Figure 3:
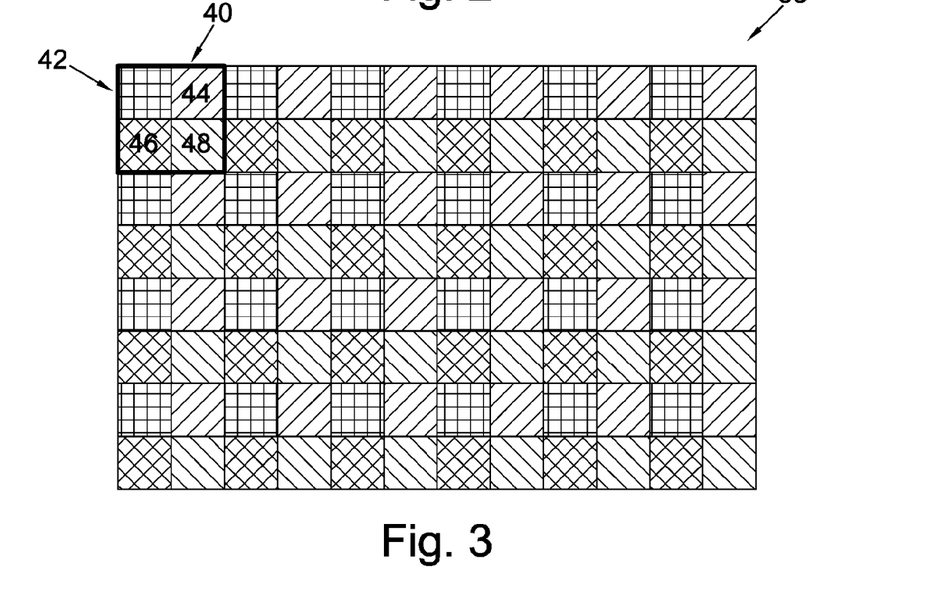
FIG. 3 is a representative diagram of an arrangement of sensor elements according to an embodiment.

FIG. 3 shows an alternative sensor element pattern 38 suitable for the image sensor array 12. The pattern 38 is represented by a rectangular grid with a length of 12 sensor elements and height of 8 sensor elements. The image sensor array represented by pattern 38 has a colour sensor array made up of image sensor elements and a communication sensor array made up of communication sensor elements. Groups of one or more communication sensor elements of the communication sensor array are distributed and interspersed within the image sensor elements of the colour sensor array. These groups are surrounded by image sensor elements. It will be understood that a group of one communication sensor element refers to a single sensor element.

The pattern 38 of FIG. 3 may be defined by a unit cell 40. The unit cell 40 is the smallest, repeating pattern of the pattern 38 and is a square of two sensor elements by two sensor elements. The component sensor elements of the unit cell 40 are a mixture of colour sensor elements and communication sensor elements. Starting from the left hand side, the first row of the unit cell 40 is a blue sensor element 42 followed by a green sensor element 44. Again, starting from the left hand side, the second row of unit cell 40, below the first row, is a communication sensor element 46 followed by a red sensor element 48. The image sensor array represented by image sensor array 12 can be drawn by repeating the unit cell 40.

The image sensor array represented by pattern 38 has an equal number of green, red, blue and communication sensor elements. This sensor element arrangement is more suited to applications where pixel resolution is more important than human perceptual signal to noise ratio, for example in military imaging applications.

Figure 4:
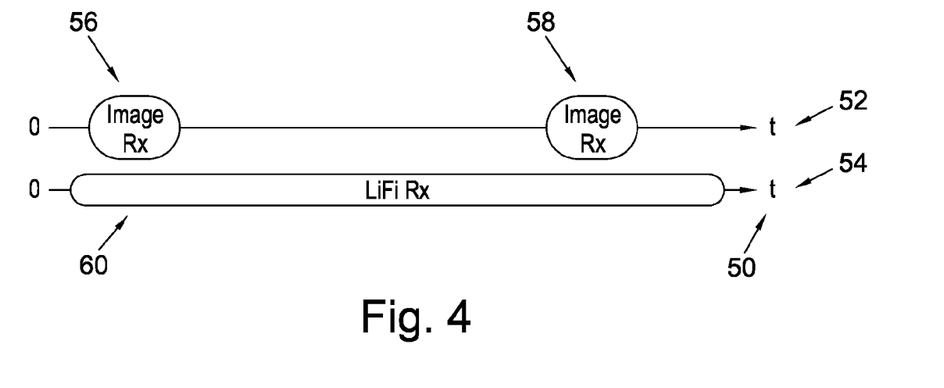
FIG. 4 is a schematic diagram of a mode of operation of an interface of an image sensor according to an embodiment.
Figure 5:
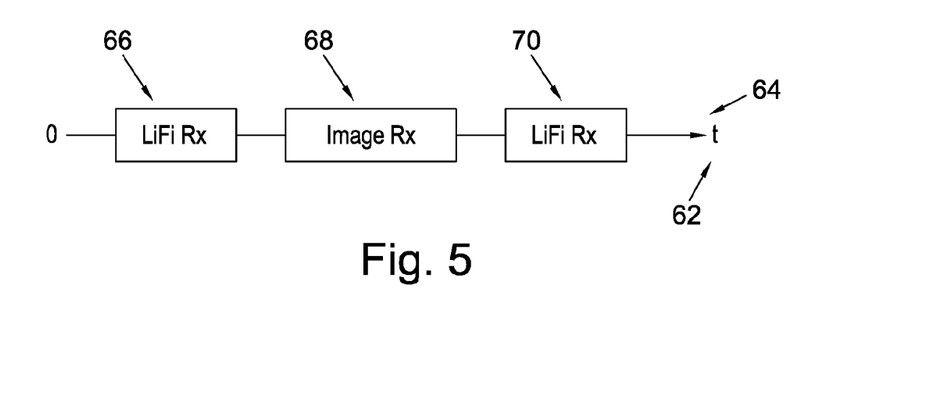
FIG. 5 is a schematic diagram of an alternative mode of operation of an interface of an image sensor according to an embodiment.

FIG. 4 and FIG. 5 show two schematic diagrams of example implementations of the data interface 18 between the image sensor 10 and the host processor 20. The data interface 18 may be any high throughput data interface. In this example, this is a camera serial interface (CSI), for example CSI-2 or CSI-3. FIG. 4 shows a parallel mode of operation of the data interface 18. FIG. 4 shows a time axis 50 representing a period of time. FIG. 4 has two parallel data streams: an image data stream 52 and a communication data stream 54. A first image data packet 56 at a first time and a second image data packet 58 at a second time are shown in the image data stream 52. Communication data 60 are shown on the communication data stream 54. Image data from the image channel and communication data from the communication channel of the processing resource 16 arrive at the data interface 18 at the same moment in time. The data interface 18 then transmits the two streams in parallel to the host processor 20.

Arbitration is a process of allocating access to shared resources. There is no need for arbitration in parallel mode. Instead, sensor configuration information is shared between the host processor 20 and the image sensor 10 over a separate control bus during a configuration phase. The implementation of the separate control bus is described with reference to FIG. 11. The sensor configuration information contains knowledge of how bandwidth of the data interface 18 is split between the image data stream 52 and the communication data stream 54, for example, how many data interface 18 lanes are attributed to communication and how many lanes are attributed to image. A data interface of the host processor 20 that decodes the transmitted data also has access to the sensor configuration information. Since the sensor configuration information contains all the information needed for parallel mode to operate without any further need for arbitration. The parallel mode is suitable when there is an excess of available throughput in the data interface 18 protocol. For example, by decreasing image resolution of the image sensor array 12 the volume of image data transmitted would be decreased and thus a parallel mode would be suitable.

FIG. 5 shows a serial mode of operation of the data interface 18. FIG. 5 shows a time axis 62 representing a period of time. FIG. 5 has a single data stream 64. Following the time axis 62, the data stream 64 has a first communication data packet 66 at a first time, a second image data packet 68 at a second time and a third communication data packet 70 at a third time. Image data from the image channel and communication data from the communication channel of the processing resource 16 are transmitted by the data interface 18 in a time-multiplexed fashion to the host processor 20. The image part of the processing resource 16 and the communication part of the processing resource 16 both need to acquire permission from the host processor 20 before a transmission is initiated. The data interface 18 merges the incoming image data stream and the incoming communication stream such that the image and communication data are transmitted in series. The serial mode of operation is applicable when an image stream and a communication stream need higher bandwidth and cannot be transmitted in parallel. In particular, this mode of operation is well suited to applications where resources are scare, for example where there is a tight power budget in a device or if there is a demand for higher image bandwidth for high quality image capture.

Figure 6:
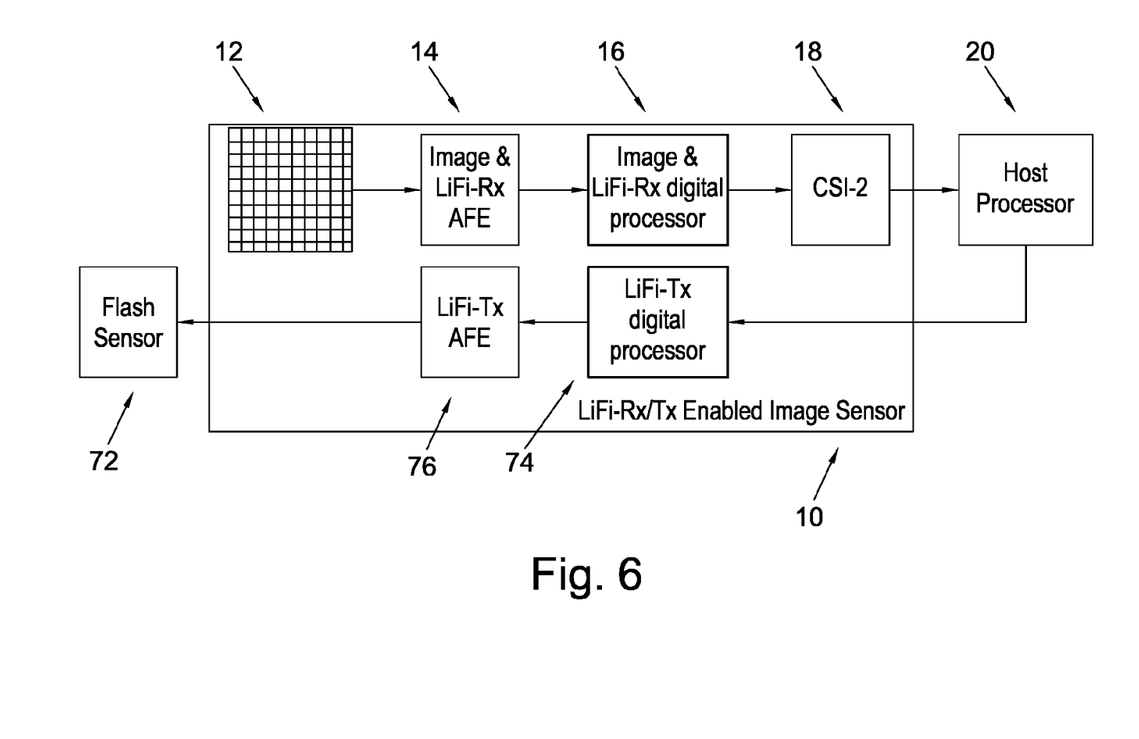
FIG. 6 is a block schematic diagram of the image sensor with an additional flash unit according to an embodiment.

FIG. 6 shows a block diagram of an image sensor 71. The image sensor 71 is a modified version of the image sensor 10 to include an additional flash unit 72. The image sensor 71 has all the components as described with reference to FIG. 1 with the addition of the following: a flash processing resource 74 and a flash analogue front end 76. The flash unit 72 contains one or more LEDs. The flash analogue front end 76 contains driving circuitry to drive the one or more LEDs of the flash unit 72. The image sensor array 12, the analogue front end 14, the processing resource 16, the flash analogue front end 76 and the flash processing resource 74 are all integrated on to a single chip.

In operation, the host processor 20 provides a communication data signal to the flash processing resource 74 which encodes the communication data signal onto a drive signal. The drive signal is provided to the flash analogue front end 76 to produce a drive current for driving the LEDs of the flash unit 72. A suitable LED has an operating range in the region 0 to 20 MHz. The flash unit 72, once driven, produces an outgoing wireless communication signal. The flash unit 72 can operate either in an image mode or in a communication mode.

A standard flash unit 72 may contain more than one LED. An alternative to the above arrangement is to provide more than one different driving circuit in the flash analogue front end 76 for the more than one LEDs of the flash unit 72. In this arrangement, the flash unit 72 has a first group of image LEDs and a second group of communication LEDs and the image LEDs are driven by image part of the processing resource 16 and the flash LEDs are driven by the flash processing resource 74. This mode of operation, allows the flash unit 72 to produce a flash and a wireless optical communication signal simultaneously.

Figure 7:
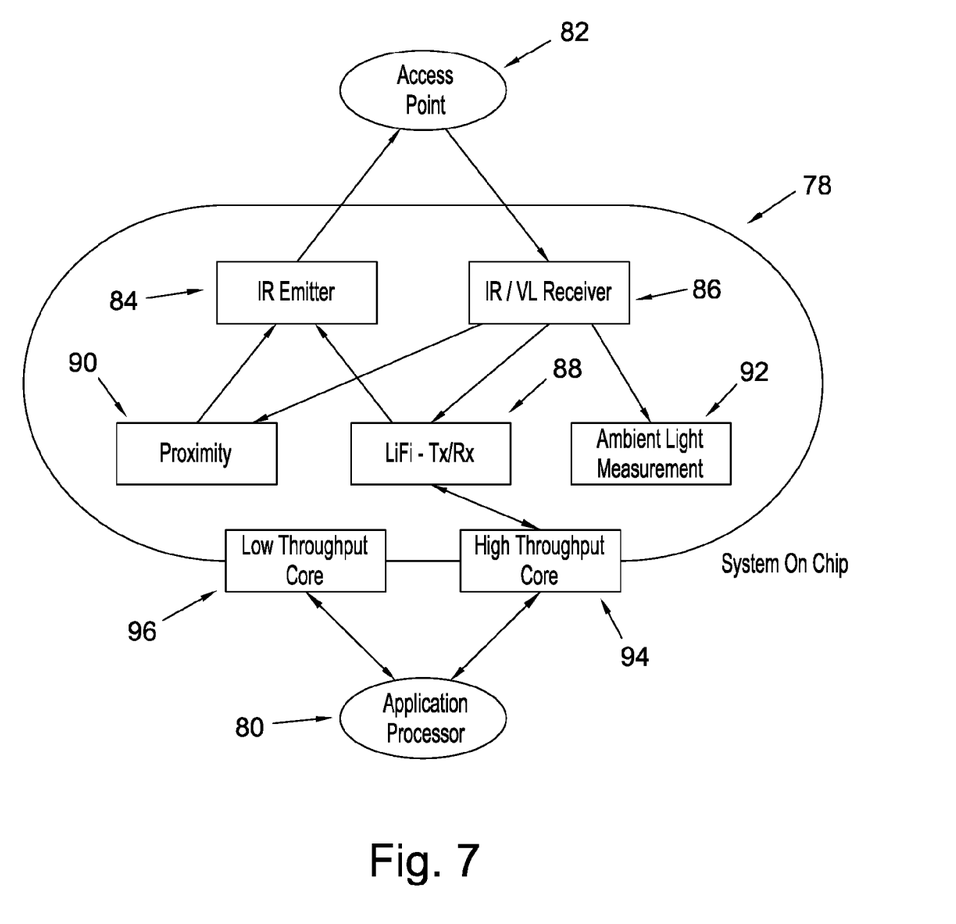
FIG. 7 is a block diagram of an image sensor with wireless optical communication capability according to an embodiment.

FIG. 7 is a schematic diagram of a proximity sensor capable of wireless optical light communication. FIG. 7 shows an integrated proximity sensor 78 communicatively connected to a host processor 80. The proximity sensor is intended to be used in conjunction with an access point 82 that can send and receive optical wireless communication signals. The proximity sensor 78 has several components integrated on a single chip: an emitter 84, a receiver 86, an optical light communication module 88, a proximity signal module 90 and an ambient light signal module 92. The proximity sensor 78 is interfaced with the host processor 80 by a first data interface 94 between the communication module 88 and the host processor 80. The proximity sensor 78 is also interfaced with the host processor 80 via a second data interface 96. The communication module 88 contains a processor and driving circuitry.

The proximity sensor 78 is configured to generate proximity data representative of a nearby object or to make an ambient light measurement. Proximity sensors are commonly found placed next to camera sensors on mobile phone devices and tablets. Proximity data may be used for a variety of different purposes. The first data interface 94 is a dedicated high throughput interface, for example a camera serial interface (CSI-2/3). The second data interface 96 is a low throughput interface, for example a configuration interface that is used for both control and read-out. The second data interface 96 may be, for example, an inter-integrated circuit (I2C) or serial peripheral interface (SPI).

The proximity sensor operates to perform proximity or ambient light sensing together with wireless optical communication operation. The host processor 80 sends a signal to the proximity signal module 90 via the second data interface 96. The proximity signal module 90 drives the emitter 84 to generate an outgoing optical signal, for example an infrared signal. The outgoing optical signal strikes a nearby object and is then sensed by and the receiver 86 which senses the incoming optical signal. The incoming optical signal is then processed by the proximity signal module 90 to obtain proximity data. The proximity data is then sent to the host processor 20 via the second data interface 96. In a similar fashion, the proximity sensor 78 is able to perform an ambient light measurement by sensing an incoming optical signal at the receiver 86 which converts the incoming ambient light into an electrical signal. The sensed electrical signal is then processed by the ambient light signal module 92 to obtain ambient light data which may be sent to the host processor 80 via the second data interface 96.

In addition to the above functionality the proximity sensor 78 is configured to emit wireless optical light communication signals. Communication data to be transmitted is sent from the host processor 80 to the communication module 88 via the first data interface 94. The communication module 88 receives digital data signal via the first data interface 94 and has a processor to modulate this communication data onto a drive current and driving circuitry to provide the drive current to the emitter 84. The emitter 84 then produces an outgoing modulated wireless optical communication signal that carries the communication data. The signal is then received by the access point 82

Optionally, the communication module 88 also has a receiver processor and an analogue front end for processing received light. In operation, light containing a wireless optical communication signal is sensed by the receiver 86 and the receiver 86 converts the incident light into an electric signal. The analogue front end of the communication module 88 collects and conditions this signal, with the optional step of amplifying it. The analogue front end also include analogue to digital convertors to produce a digital signal from the electric signal. The analogue to digital convertors are capable of sampling at the frequency of the wireless optical communication signals.

These digital signals are then processed by the receiver processor. Processing the digital signals involves demodulating them to extract encoded communication data. The extracted communication data is then sent to the host processor 80 via the first data interface 94.

Figure 8:
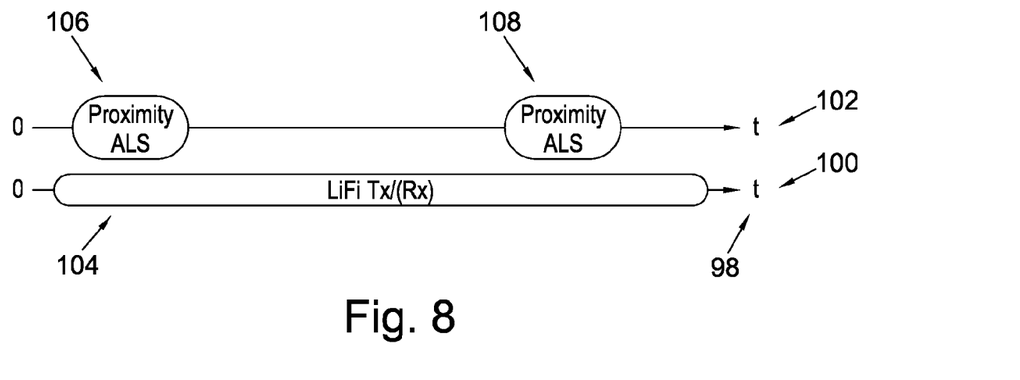
FIG. 8 is a schematic diagram of a mode of operation of an interface of a proximity sensor according to an embodiment.
Figure 9:
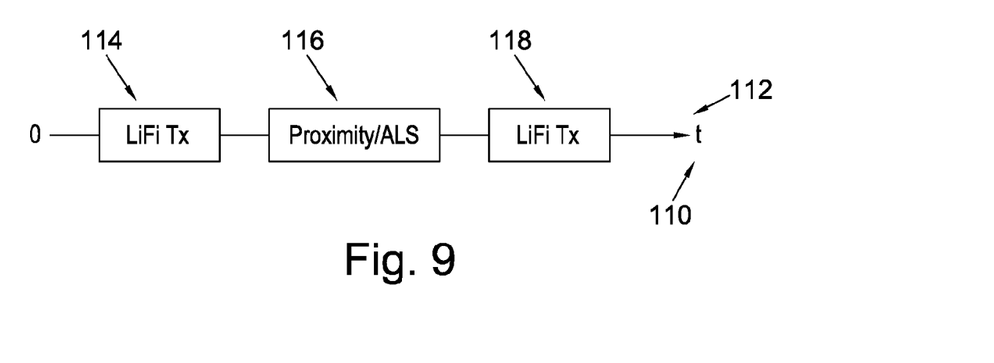
FIG. 9 is a schematic diagram of an alternative mode of operation of an interface of a proximity sensor according to an embodiment.

Suitable modes of operation of the first data interface 94 and the second data interface 96 are described in relation to FIG. 8 and FIG. 9. FIG. 8 shows a parallel mode of operation between the first data interface 94 and the second data interface 96. FIG. 8 shows a time axis 98, a first data stream 100 and a second data stream 102. The first data stream 100 carries communication data 104 from the communication module 88. The second data stream 102 carries a first proximity/ambient light data packet 106 and a second proximity/ambient light data packet 108 from the ambient light signal module 92 and/or proximity signal module 90. Parallel mode of operation involves the first data stream 100 to be transmitted over the first data interface 94 and the second data stream 102 over the second data interface 96 simultaneously.

FIG. 9 shows a serial mode of operation that can be carried out over the second data interface. FIG. 9 shows a time axis 110 and a data stream 112. The data stream 112 carries a first communication data packet 114, a proximity data and/or ambient light data packet 116 and a second communication data packet 118. The proximity data and/or ambient light data packet 116 is transmitted from the proximity signal module 90 and/or the ambient light signal module 92 over the second data interface 96. In addition, the first communication data packet 114 and the second communication data packet 118 are transmitted over the second data interface 96. The first communication data packet 114, second communication data packet 118 and proximity data and/or ambient light data packet 116 are transmitted over the second data interface 96 in a time-multiplexed fashion to the host processor 80. The second data interface 96 merges the incoming communication data and the incoming ambient light/proximity data into the data stream 112 such that the image and communication data are transmitted in series. The serial mode of operation is suitable for low bandwidth applications. For example, if the communication data does not require much bandwidth, then it may be sent alongside the proximity and/or ambient light data over the low throughput second data interface 96. In such a case, the first data interface 94 may be not used.

Figure 10:
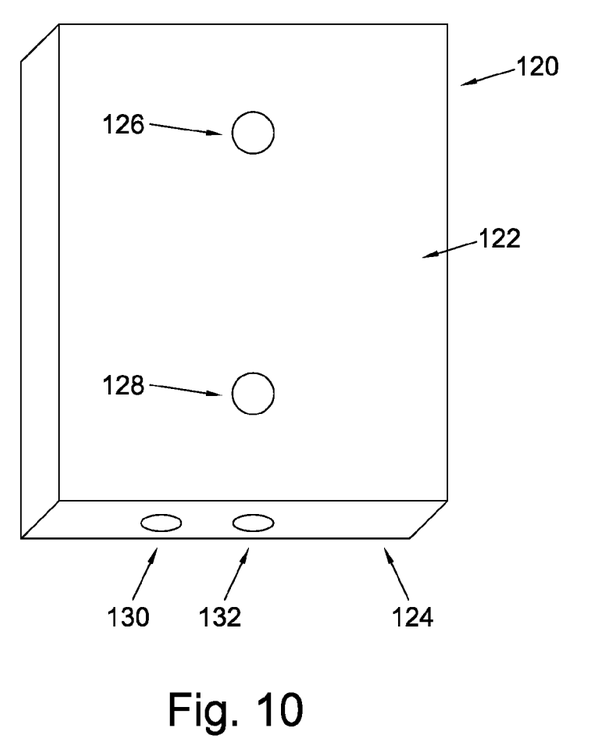
FIG. 10 is a top view of a proximity sensor according to an embodiment.

FIG. 10 is a top view of an enclosure 120 for a proximity sensor. The proximity sensor is located inside the enclosure 120. The enclosure 120 has a top surface 122 and a side surface 124. On the top surface 122 are two holes: a first transmission hole 126 and a first receiving hole 128. On the side surface 124 are two holes: a second transmission hole 130 and a second receiving hole 132. The second transmission hole 130 and second receiving hole 132 are optional, and the enclosure may be constructed without them.

As described above, the proximity sensor can produce an outgoing optical proximity signal and an outgoing wireless optical communication signal. The proximity sensor can receive an incoming optical proximity signal and an incoming wireless optical communication signal. The holes of the enclosure 120 are positioned relative to emitter and receiver of the proximity sensor as follows. The first transmission hole 126 is positioned such that the outgoing optical proximity signal can be emitted through it. The first receiving hole 128 is positioned such that the incoming optical proximity signal can be received through it.

Concerning the optical communication signals FIG. 10 shows two possibilities for position. As a first option, the proximity sensor may also be configured to emit the outgoing optical wireless communication through the first transmission hole 126. For example, proximity sensor may be configured such that the same LED produces both the outgoing proximity signal and the outgoing wireless optical communication signal. Likewise, the proximity sensor may be configured to receive the incoming optical wireless communication through the first receiving hole 128. For example, the proximity sensor may be configured such that the same photodiode may receive both the incoming proximity signal and the incoming wireless optical communication signal.

Alternatively, the proximity sensor may be configured to emit the outgoing proximity signal through the first transmission hole 126 and the outgoing wireless optical communication signal through the second transmission hole 130. In this case, the proximity sensor is configured such that a first LED produces the outgoing proximity signal and a second LED produces the outgoing wireless optical communication signal. Likewise, the proximity sensor may be configured to receive the incoming proximity signal through the first receiving hole 128 and the incoming wireless optical communication signal through the second receiving hole 132. In this case, the proximity sensor is configured such that a first photodiode receives the incoming proximity signal and a second photodiode receives the incoming wireless optical communication signal.

Figure 11:
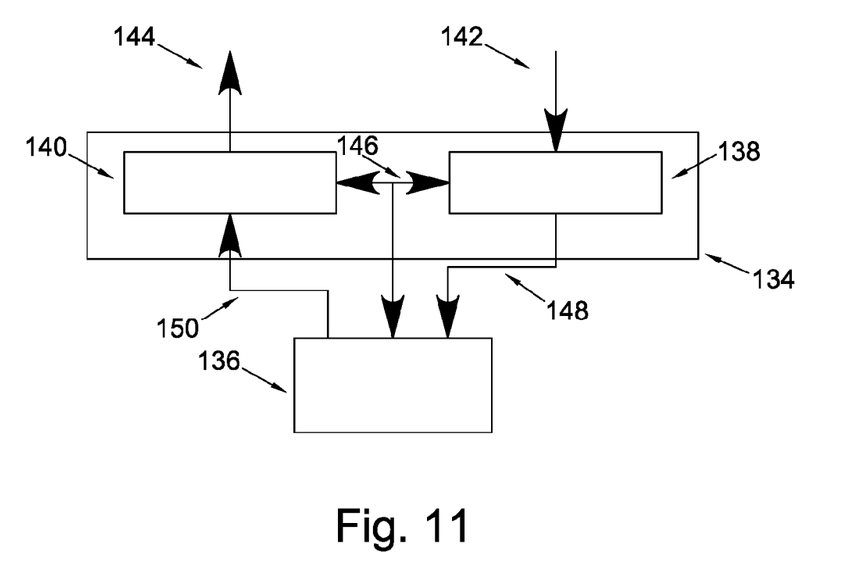
FIG. 11 is a block schematic diagram of a camera and proximity sensor module according to an embodiment.

FIG. 11 shows a schematic block diagram showing a wireless optical communication module 134 and a host processor 136. The module 134 has an image sensor 138, as described with reference to FIG. 1 and a proximity sensor 140 as described with reference to FIG. 7. The image sensor 138 of the module 134 is capable of receiving an incoming wireless optical communication signal 142 and an incoming image signal. The proximity sensor 140 is capable of producing an outgoing wireless optical communication signal 144 and an outgoing optical proximity signal.

A configuration bus 146 connects the image sensor 138, the proximity sensor 140 and the host processor 136. The configuration bus 146 provides an interface for configuration data to be transmitted from the host processor 136 to the module 134. The configuration bus is a low-bandwidth communication bus. The configuration bus 146 also provides a data interface between the image sensor 138 and the proximity sensor 140 to allow for communication between the two sensors to adjust various image capture parameters, for example determining an optimal zoom configuration. The configuration bus may be an inter-integrated circuit (I2C) or a serial peripheral interface (SPI).

A first data bus 148 connects the image sensor 138 and the host processor 136. The first data bus 148 carries communication data and image data transmitted from the image sensor 138. The first data bus 148 is a high throughput interface, for example a camera serial interface (CSI-2/3). Compared to a known camera sensor and proximity sensor module no physical modification to the first data bus 148 is required. However, unlike a known camera sensor and proximity sensor module, the first data bus 148 carries both types of data. The configuration bus 146 can send configuration data including permission data between the image sensor 138 and the host processor 136.

A second data bus 150 connects the proximity sensor 140 and the host processor 136. In addition to modifications to sensor hardware, the second data bus 150 is added to a known camera sensor and proximity sensor module to carry communication data from the host processor 136 to the proximity sensor 140 to be transmitted as part of a wireless optical communication signal. The second data bus 150 is a high throughput interface, for example a camera serial interface (CSI-2/3). Using a camera serial interface (CSI-2/3) provides uniformity between first data bus 148 and the second data bus 150.

A skilled person will appreciate that variations of the disclosed arrangements are possible without departing from the invention. Accordingly, the above description of the specific embodiment is made by way of example only and not for the purposes of limitation. It will be clear to the skilled person that in alternative embodiments straightforward modifications may be made to each of the features described.

The invention claimed is:

1. A camera system comprising a camera for capturing an image, the camera comprising:
   an image sensor configured to generate image sensor data in response to received light;
   a camera processing resource configured to process the image sensor data to obtain image data and incoming optical wireless communication data, wherein the incoming optical wireless communication data are modulated in accordance with an optical wireless communication modulation scheme, wherein obtaining the incoming optical wireless communication data comprises performing a demodulation process in respect of at least part of the image sensor data, and wherein the camera processing resource is further configured to transmit the incoming optical wireless communication data and the image data to at least one further processing resource; and
   a proximity sensor configured to generate proximity data representative of a nearby object using optical signals, wherein the proximity sensor comprises:
      an emitter configured to produce an outgoing optical signal;
      a receiver configured to receive an incoming optical signal comprising an incoming optical proximity signal and an incoming optical wireless communication signal modulated in accordance with an optical wireless communication scheme; and
      a proximity processing resource configured to perform at least one of a) or b):
         a) a modulation process to encode outgoing optical wireless communication data on at least part of the outgoing optical signal;
         b) a demodulation process in respect of at least part of the incoming optical signal to obtain incoming communication data.

2. The camera system of claim 1, wherein the image sensor and camera processing resource form part of or are on a single chip.

3. The camera system of claim 1,
   wherein the camera processing resource comprises a first processor and a second processor, and
   wherein the first processor is configured to process the image sensor data and the second processor is configured to process the incoming optical wireless communication data.

4. The camera system of claim 1, wherein the image sensor comprises an array of sensor elements comprising:
   image sensor elements configured to generate image signals in response to received light, wherein ones of the image sensor elements are configured to sense light of a respective one of a plurality of different colors; and
   communication sensor elements configured to generate communication signals in response to received light,
   wherein the communication sensor elements are distributed in the array of sensor elements in groups of one or more communication sensor elements, and
   wherein one or more of the groups are surrounded by one or more of the image sensor elements.

5. The camera system of claim 4, wherein the array of sensor elements comprises a repeating arrangement of unit cells, each unit cell comprising at least one of the communication sensor elements and a plurality of the image sensor elements.

6. The camera system of claim 5, wherein the unit cell comprises three image sensor elements.

7. The camera system of claim 5, wherein the image sensor elements of the unit cell comprise a first sensor element configured to sense red light, a second sensor element configured to sense green light, and a third sensor element configured to sense blue light.

8. The camera system of claim 1, wherein the image sensor comprises an image sensor array of sensor elements comprising:
   image sensor elements for generating image signals in response to received light, wherein ones of the image sensor elements are configured to sense light of a respective different color; and
   communication sensor elements for generating communication signals in response to received light,
   wherein the communication sensor elements are arranged in one or more rows or columns extended along one or more edges of the image sensor array.

9. The camera system of claim 8, further comprising:
image signal conditioning circuitry configured to collect the image signals that are generated from the image sensor elements and condition the image signals into a form suitable for the camera processing resource; and
communication signal conditioning circuitry to collect the communication signals that are generated from the communication sensor elements and condition the communication signals into a form suitable for the camera processing resource.

10. The camera system of claim 9, wherein the communication signal conditioning circuitry comprises one or more analog to digital convertors (ADCs) configured to sample the communication signals at a frequency characteristic of an optical light communication signal.

11. The camera system of claim 1, wherein the camera processing resource is configured to transmit the outgoing optical wireless communication data and image data over an interface in parallel or in series.

12. The camera system of claim 11, wherein the interface comprises a camera serial interface (CSI).

13. The camera system of claim 1, further comprising:
a flash unit,
wherein the camera processing resource is further configured to provide a modulation signal encoding optical wireless communication data to the flash unit such that the flash unit produces a modulated optical communication signal.

14. The camera system of claim 13,
wherein the flash unit further comprises one or more flash emitters and one or more communication emitters, and
wherein the camera processing resource is further configured to provide the modulation signal encoding optical wireless communication data to the flash emitters and a flash signal to the flash emitters.

15. The camera system of claim 1, wherein the proximity processing resource is further configured to receive the outgoing optical wireless communication data from at least one further processing resource.

16. The camera system of claim 1, wherein the emitter, receiver and proximity processing resource are integrated on a single chip.

17. The camera system of claim 1, the proximity sensor further comprising:
driving circuitry configured to provide a modulation signal to the emitter,
wherein the modulation signal is based on the outgoing optical wireless communication data received from one further processor.

18. The camera system of claim 17, wherein the driving circuitry comprises a digital to analog convertor configured to provide a modulation signal at a frequency characteristic of an optical light communication signal.

19. The camera system of claim 1, wherein the receiver comprises:
a sensor generating a communication signal in response to received light, and
conditioning circuitry to collect the communication signal and condition the communication signal into a form suitable for the proximity processing resource.

20. The camera system of claim 1, wherein the proximity processing resource is configured to transmit and/or receive optical wireless communication data and proximity data in series over a first interface.

21. The camera system of claim 20, wherein the first interface comprises a high speed interface.

22. The camera system of claim 20, wherein the first interface comprises a camera serial interface (CSI).

23. The camera system of claim 1, wherein the proximity processing resource is configured to transmit and/or receive optical wireless communication data and proximity data in parallel over a first and second interface.

24. The camera system of claim 1, wherein the emitter and receiver are positioned on an edge of a housing of the proximity sensor.

25. The camera system of claim 1, wherein the camera processing resource is configured to transmit the incoming optical wireless communication data and image data in series or in parallel over a first interface and the proximity processing resource is configured to receive outgoing optical wireless communication data over a second interface.

26. The camera system of claim 1, further comprising a control bus for carrying control data between the camera processing resource, the proximity processing resource and the at least one further processing resource.

27. A method of receiving communication data comprising:
generating image sensor data in response to received light;
processing the image sensor data to obtain image data and incoming optical wireless communication data, wherein the incoming optical wireless communication data are modulated in accordance with an optical wireless communication modulation scheme, wherein obtaining the incoming optical wireless communication data comprises performing a demodulation process in respect of at least part of the image sensor data;
transmitting the incoming optical wireless communication data and the image data to at least one further processing resource;
generating proximity data, using a proximity sensor, wherein the proximity data are representative of a nearby object using optical signals;
producing an outgoing optical signal, using an emitter of the proximity sensor;
receiving an incoming optical signal, using a receiver of the proximity sensor, wherein the incoming optical signal comprises an incoming optical proximity signal and an incoming optical wireless communication signal modulated in accordance with an optical wireless communication scheme; and
performing at least one of a) or b):
a) a modulation process to encode outgoing optical wireless communication data on at least part of the outgoing optical signal;
b) a demodulation process in respect of at least part of the incoming optical signal to obtain incoming optical wireless communication data.

* * * * *

UNITED STATES PATENT AND TRADEMARK OFFICE
CERTIFICATE OF CORRECTION

| | | |
|---|---|---|
| PATENT NO. | : 11,172,113 B2 | Page 1 of 1 |
| APPLICATION NO. | : 16/087202 | |
| DATED | : November 9, 2021 | |
| INVENTOR(S) | : Angelos Spanos | |

It is certified that error appears in the above-identified patent and that said Letters Patent is hereby corrected as shown below:

On the Title Page

(30) Foreign Application Priority Data: Please correct "1605142" to read -- 1605142.7 --

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*